(12) United States Patent
Schlagenhauf (10) Patent No.: US 7,029,210 B2
(45) Date of Patent: Apr. 18, 2006

(54) CUTTING TOOL WITH INDEXABLE INSERT

(75) Inventor: Uwe Schlagenhauf, Strassberg (DE)

(73) Assignee: Dr. Joerg GUEHRING, Albstadt (DE)

( * ) Notice: Subject to any disclaimer, the term of this patent is extended or adjusted under 35 U.S.C. 154(b) by 452 days.

(21) Appl. No.: 10/238,610

(22) Filed: Sep. 11, 2002

(65) Prior Publication Data

US 2003/0053872 A1 Mar. 20, 2003

(30) Foreign Application Priority Data

Sep. 12, 2001 (DE) ................ 101 44 923

(51) Int. Cl.
*B23B 5/00* (2006.01)

(52) U.S. Cl. .................. 408/153; 407/36; 407/45; 407/46; 408/161; 408/179; 408/185; 408/713

(58) Field of Classification Search ............. 408/153, 408/159, 161, 162, 179, 180, 181, 185, 190, 408/197, 198, 713; 407/37, 38, 39, 45, 46, 407/36, 77, 88, 89
See application file for complete search history.

(56) References Cited

U.S. PATENT DOCUMENTS

| 1,554,669 | A |   | 9/1925 | Watkins |
| 2,452,877 | A |   | 11/1948 | Sheridan |
| 3,058,198 | A |   | 10/1962 | Williams |
| 3,152,493 | A | * | 10/1964 | Sullivan et al. ............ 408/153 |
| 3,203,493 | A | * | 8/1965 | Bergstrom ................ 175/383 |
| 3,236,125 | A | * | 2/1966 | Lundgren ................. 408/197 |
| 3,286,557 | A | * | 11/1966 | Rietzler et al. ............ 408/179 |
| 3,332,130 | A |   | 7/1967 | Armstrong |
| 3,946,475 | A | * | 3/1976 | Hopkins .................... 407/41 |
| 4,163,624 | A | * | 8/1979 | Eckle ...................... 408/185 |
| 4,428,704 | A |   | 1/1984 | Kalokhe |
| 4,547,100 | A | * | 10/1985 | Naccarato et al. .......... 407/39 |
| 4,611,959 | A | * | 9/1986 | Kress et al. ............... 408/180 |
| 5,217,333 | A | * | 6/1993 | Hunt ....................... 408/181 |
| 5,599,145 | A | * | 2/1997 | Reinauer et al. ........... 408/233 |
| 5,913,643 | A | * | 6/1999 | Fowler et al. ............. 407/36 |
| 6,514,019 | B1 | * | 2/2003 | Schulz .................... 408/59 |
| 6,565,296 | B1 | * | 5/2003 | McKinley et al. .......... 408/224 |

FOREIGN PATENT DOCUMENTS

| DE | 27 54 499 | 6/1979 |
| DE | 27 57 273 | 7/1979 |
| DE | 32 42 765 | 7/1983 |
| DE | 38 01 394 | 7/1989 |

(Continued)

Primary Examiner—Daniel W. Howell
(74) Attorney, Agent, or Firm—Oblon, Spivak, McClelland, Maier & Neustadt, P.C.

(57) ABSTRACT

A circulating tool for cutting of workpieces including a carrier element that bears at least one cutter blade insert in an exactly positioned manner. A device is provided for adjusting the position of the insert relative to the carrier element and a clamping device is provided using a clamping claw, with which the insert can be fixed in the adjusted position relative to the carrier element in that the clamping claw presses the insert flat against a support surface. In order to be able to use indexable inserts of any form without providing weakening openings and to obtain the greatest possible measure of free space for configuring the tool and shaving removal with a space-saving configuration of the adjusting and clamping apparatus, the insert is accommodated in a pocket of the clamping claw and the support surface is directly constructed on the carrier element.

32 Claims, 5 Drawing Sheets

FOREIGN PATENT DOCUMENTS

| | | |
|---|---|---|
| DE | 43 00 289 | 7/1994 |
| DE | 196 35 490 | 3/1998 |
| DE | 197 25 219 | 12/1998 |
| DE | 198 00 440 | 7/1999 |
| EP | 0 126 432 | 11/1984 |
| EP | 0 154 021 | 9/1985 |
| EP | 0 381 924 | 8/1990 |
| EP | 0 385 709 | 9/1990 |
| FR | 1 415 885 | 10/1965 |
| WO | WO 91/04813 | * 4/1991 |
| WO | WO 96/39271 | 12/1996 |
| WO | WO 97/34722 | 9/1997 |

* cited by examiner

CUTTING TOOL WITH INDEXABLE INSERT

BACKGROUND OF THE INVENTION

1. Field of the Invention

The invention concerns a tool, especially a rotary tool for machining, especially for the cutting processing of workpieces, preferably a cutting tool with a indexable insert.

2. Discussion of the Background

Tools outfitted with cutter blade inserts such as, for example, indexable inserts, are as a rule used when it comes to processing functional areas with the greatest precision possible and at the same time keeping the life of the tool as long as possible in order to keep the economical aspect of the comparatively expensive tool at the highest possible level. Various approaches for configuring such tools are known.

Tools, such as, for example, milling or facing heads, have become known from the documents DE 3242765 A, DE 19800440 A1, DE 19725219 A1, EP 0385709 A1, DE 19635490 A1 and DE 4300289 in which the cutter blade attachment, such as, for example, the indexable insert, is mounted firmly on a tool cartridge cartridge. The indexable insert is fastened in a stationary and immovable on the cartridge using a fastening screw. The cartridge sits adjustably on a carrier element. This configuration indeed enables the fine adjustment of the cutter blade of the indexable insert even if indexable inserts according to DIN are used. The disadvantage of this known arrangement nonetheless lies in that a great deal of space is needed, so that the area of use of these tools remains comparatively restricted. Comparable tool arrangements, which operate with cartridge-like cutter blade carriers, are the object of documents WO 96/39271 and DE 3801394 A1.

A cutting arrangement is known from document WO 97/34722 where a indexable insert is accommodated in an especially configured recess in the carrier element. The indexable insert is directly clamped on the carrier element by means of a centrally arranged fastening screw, whereby a wedge transmission arrangement is provided in order to adjust the cutter blade radially. The disadvantage of this arrangement lies in the fact that the carrier element can only be used for a specific plate shape, and that the adjustment possibilities remain restricted. Owing to the fact that a central fastening screw must be provided for the indexable insert, only indexable inserts beginning with a certain minimal size can moreover to used.

Fastening indexable inserts on the carrier element by means of so-called micron-adjustment devices and fixing them in place after adjustment with suitable clamping devices is also ready known. This state of the art is described in the documents DE 2754499 A1, DE 2757273 A1, EP 0154021 B1 and EP 0126432 B1. The disadvantage of these arrangements lies in the fact that once again the tool can only be used for a certain type of indexable insert, and in addition to this, the clamping devices are relatively complex, i.e. they must be constructed with many parts movable in relation to one another, owing to which the tool becomes expensive. Also the stability of the tool suffers in these expensive design forms.

A tool is known from document EP 0381924 A2, in which a clamping claw is used for fixing the cutter blade attachment into position, wherein said claw is pressed against the carrier element using a clamping screw, and thereby pressed with a protruding end segment against the cutter blade attachment, which therefore is clamped flat against a floor surface of a recess in the carrier element. The disadvantage of this arrangement consists in that a fine adjustment of the cutter blade attachment is not possible.

SUMMARY OF THE INVENTION

As mentioned above, representative tools are used when functional surfaces are supposed to be machined economically with high quality and tight tolerance settings. In order to keep the adjustment times of the tool or the resetting time as short as possible, the standard of being able to conduct an exact adjustment of the functional cutter blade of the cutter blade attachment relative to the reference system, for example to the axis of rotation of the carrier element or to a further tool borne by the carrier element, within the shortest time is imposed upon a tool of this type. Hence it is necessary, for example, with a tool for machining valve seats in internal combustion motors to finish the inclination of the valve seat surface exactly to the angular minute in relation to the seating surface for the guide bushing of the valve shaft. For this reason, it is necessary to construct the tool such that the indexable insert is not only carried in a stable manner by the carrier element, but can also be firmly clamped and finely adjusted following group positioning preferably with regard to several degrees of freedom with simple moves and within little time.

Underlying the invention is the objective of further developing a tool of the type previously mentioned such that it is possible with a simple design to fix cutter blade inserts, especially indexable inserts in accordance with DIN, to the carrier element in such a way that with little space an exact fine adjustment of the functional cutter blade can be assured, whereby the flux of force from the cutter blade to the carrier element should subject the cutter blade insert to the least possible and to defined stress.

This objective is accomplished through the features of the present invention.

In accordance with the invention, the cutter blade insert is preferably accommodated form-locking in a pocket of the clamping claw. The clamping claw clamps the cutter blade insert over the pocket against a correspondingly shaped support surface, which is constructed in accordance with the invention directly on the carrier element. In this way, the number of components can be restricted to a minimum owing to which even the flux of force from the functional cutter blade to the carrier element is optimized. Since merely one mobile element, namely the clamping claw, must be fixed into position on the carrier element, little space is also required so that the clamping principle of the invention is applicable for all types of tools, that means also for tools with small operating diameters. A further advantage consists in that, in accordance with the invention, the cutter blade insert, such as, for example, an indexable insert, no longer requires a central passage bore hole in order to implement the fastening on the tool. Also the smallest indexable inserts can also be used therewith, which otherwise would be too much weakened by a central through-hole. Subjecting the cutter blade insert to stress, especially an inserted indexable insert, takes place such that the plate on the one hand lies in each case over a large area in the pocket of the clamping claw, and on the other hand lies on the support surface on the carrier element. Contact stress can thus be minimized, which is particularly advantageous when extremely hard cutter blade materials, such as, for example, hard metal, ceramic materials or cermet material are used. Since the adjustment of the cutter blade insert or the indexable insert does not take place directly, but rather indirectly by adjusting the clamping claw, the setting and adjusting devices can be dimensioned relatively large, which has a positive effect on handling in relation to cutter blade adjustment. The clamping force applied to the cutter blade insert can also be raised because larger clamping apparatuses can be used. Thus significantly larger screws can be used with larger widths over hexagonal flats and therewith with larger transmittable forces.

Preferably the pocket in the clamping claw accommodates the cutter blade insert in a form-locking manner such that the cutter blade insert can be braced through at least two surfaces standing at an angle toward each other in the pocket. A statically specified fixation in position therewith arises with a minimization of the compulsive forces acting upon the indexable insert. The form-locking accommodation of the cutter blade insert, such as, for example, a indexable insert according to DIN, in the pocket of the clamping claw permits a large number of configuration possibilities of the pocket. Stabilizing the cutter blade insert over additional surfaces is also possible, for example through a large-surface contact of the free surface of the cutter blade insert on the undercut walls of the pocket.

An especially simple configuration results with the further development of a clamping claw that basically has the shape of a cuboid. In this case, the pocket in the clamping claw is constructed as a recess in a plane surface of the cuboid, whereby this recess is adapted to the dimension of the cutter blade insert such that the cutter blade insert in the state in which it is accommodated in the clamping claw projects with a contact region striking against the support surface by a predetermined dimension beyond the clamping claw. This dimension amounts, for example, to a fraction of a millimeter, for example 0.2 mm. The clamping claw is stressed against the carrier element such that it has contact points on both sides of the introduction of force for the clamping force, which has the advantage of an exactly defined introduction of force.

The construction is additionally simplified in this way if the clamping claw is accommodated in a recess of the carrier element, whereby the support surface is a component of the recess.

An especially simple apparatus for clamping the clamping claw is provided if the clamping screw is oriented at a specified tilt angle toward the support surface. Preferably this angle will basically nonetheless amount to 90°.

It is accordingly merely necessary in accordance with the invention to provide a certain, small lateral play for the passage of the clamping screw in order to assure a position setting of the clamping claw and therewith of the cutter blade insert relative to the carrier element with the necessary degrees of freedom.

Especially simple measures by enabling the fine adjustment of the cutter blade insert on the carrier element are an advantage of the present invention.

During adjustment, the cutter blade insert, for example the indexable insert, does not lose flat contact with the support surface, owing to which the stress upon the cutter blade insert, especially a indexable insert, remains easy to control. The cutter blade insert can correspondingly already be pressed with a comparatively large force against the support surface before undertaking the fine adjustment of the position of the functional cutter blade.

The present invention opens up the possibility of moving or swivelling the clamping claw in a plane parallel to the support surface. In connection with the refinement of the invention, adjustment is possible in two coordinate directions, whereby the particular advantage is attained that the adjustment apparatuses are in an area that is located far away from the functional cutter blade of the cutter blade insert or the indexable insert. The shape of the clamping claw can furthermore continue to be kept very simple. Merely a recess for constructing the pocket for the cutter blade insert and a penetration for accommodating a central clamping screw is necessary.

It has become apparent that the concept in accordance with the invention of the cutter blade insert clamping is especially advantageous when the tool is configured as a rotary driven boring refinishing tool. In this case, the simplicity of construction comes particularly well to bear since the reduced space in addition has a positive effect on the vibration behavior of the tool. Of additional advantage is moreover the fact that shavings removal is but insignificantly impaired by the clamping construction for the cutter blade insert, even when the functional cutter blade of the at least one cutter blade insert has a small diameter.

BRIEF DESCRIPTION OF THE DRAWINGS

Embodiments of the invention will be explained in greater detail below on the basis of schematic drawings, wherein.

DETAILED DESCRIPTION OF THE EMBODIMENTS

Figure 1:
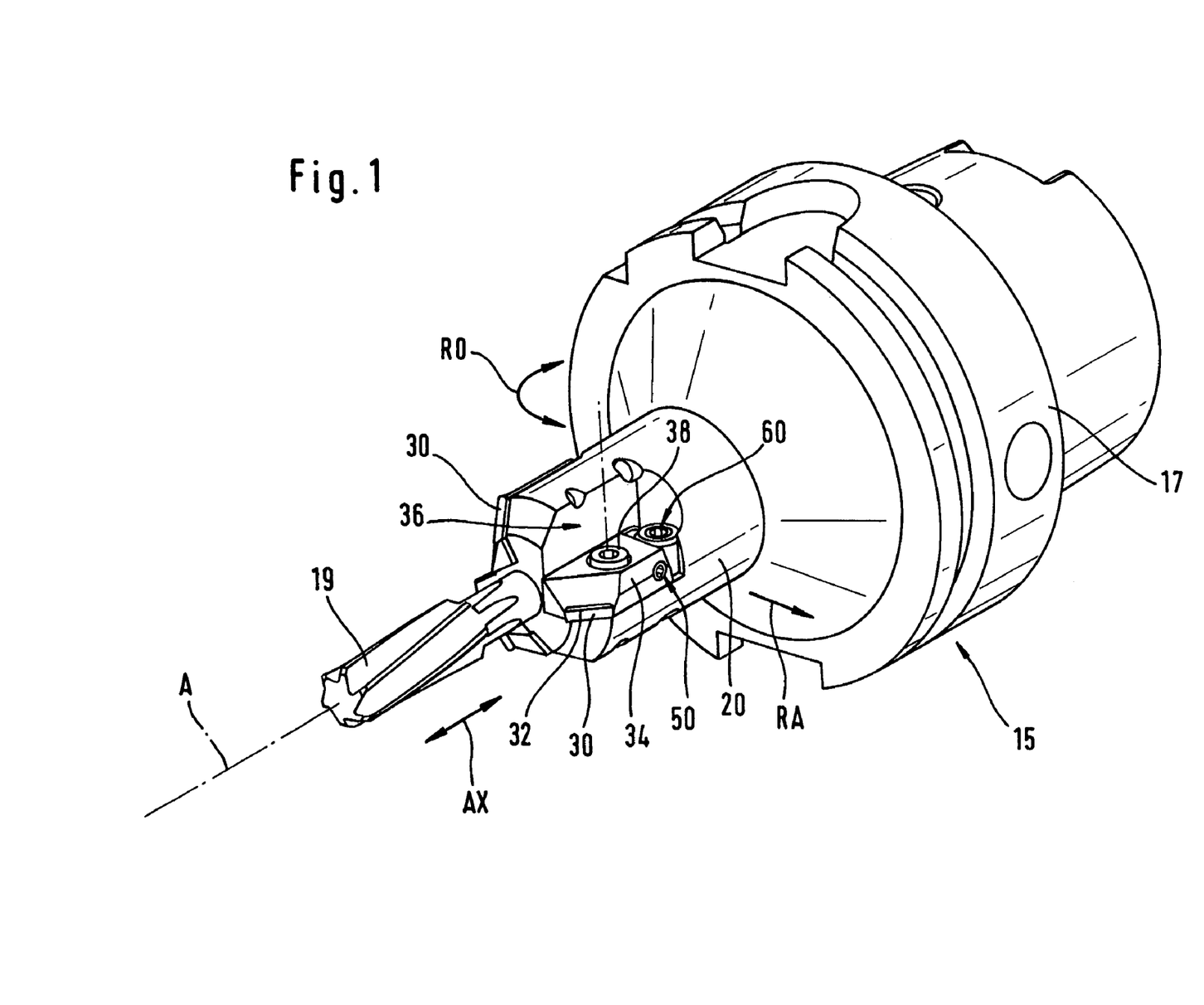
FIG. 1 depicts a perspective view of a first embodiment of the tool, whereby the tool is constructed as a fine machining tool for machining valve seats in internal combustion motors.

A large number of cutter blade inserts of supporting carrier elements 20 of a rotary driven tool 15 are designated with the reference number 20 in FIG. 1, which has an axis of rotation A. The carrier element 20 has basically a cylindrical shape and sits in a tool basic receiver 17. A reamer is designated with reference number 19, which sits firmly with its shaft in carrier element 20.

The tool shown in FIG. 1 is used, for example, in finishing cylinder heads for internal combustion motors, and specifically for fine machining a borehole for accommodating a guide bushing for the valve shaft on the one hand and the valve seating surface on the cylinder head on the other. The bore hole for the guide bushing is produced by the reamer 19 while the valve seat surface is machined by the functional cutter blades of the cutter blade inserts 30.

It is clear that an exact relative position with tight tolerance settings must be maintained between the two functional areas, namely the bore hole for the guide bushing and the valve seat surface, in order to assure a trouble-free operation of the valve mechanism. For this purpose, care must be taken that the position of the functional cutter blade 32 relative to axis of rotation A or to reamer 19 is exactly adjusted and retained fixed in the adjusted position. It is consequently necessary to position the cutter blade insert, in the embodiment shown the DIN indexable insert 30, with respect to three degrees of freedom, namely once with respect to the axial degree of freedom AX, with respect to the radial degree of freedom RA and with respect to the rotatory degree of freedom RO. The fine adjustment must moreover take place such that an adjustment possibility in the range of a hundredth of a mm or in the angular minute range is assured.

For this purpose, the cutter blade insert, i.e. the indexable insert 30, is accommodated in a form-locking manner in a clamping claw 34, which for its part is held adjustably while taking into consideration the previously described three degrees of freedom AX, RA and RO on the carrier element 20. Because the cutter blade insert, i.e. the indexable insert 30, is accommodated in a form-locking manner in the clamping claw 34, the indexable insert is carried along by adjusting the clamping claw 34 and thus experiences a fine adjustment together with the clamping claw. The adjustment takes place by means of two setting apparatuses which are designated with the reference numbers 50 respectively 60 in FIG. 1. The adjusting apparatus 50 serves to realize the radial adjustment (degree of freedom RA) and rotary adjustment (rotatory degree of freedom RO), while adjustment apparatus 60 is relied upon for axial setting (degree of freedom AX).

The clamping claw 34 basically has the shape of a cuboid, which is accommodated in an angular recess 36 of the carrier element.

A clamping screw is designated with reference number 38 with which the clamping claw 34 can be pressed against the carrier element 20 while inserting of the relevant cutter blade insert 30.

Details of the tensioning and adjustment processes of the cutter blade insert 30 will emerge from the following description of FIGS. 2 through 9, which show a possible embodiment of the invention on the basis of dimensioned work shop drawings.

Figure 2:
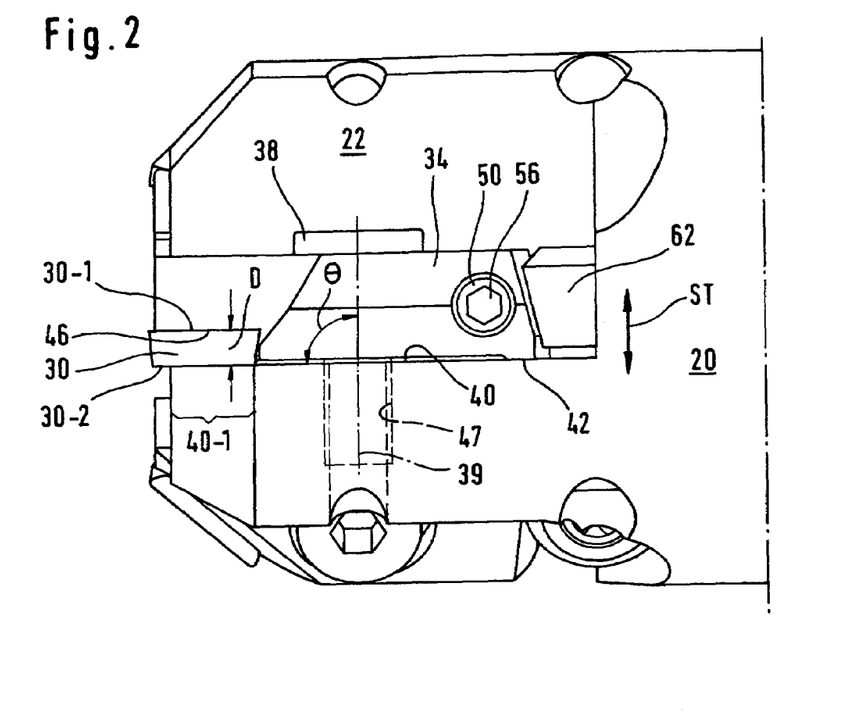
FIG. 2 illustrates on a somewhat enlarged scale the side view of a partial region of the tool in accordance with FIG. 1 with disassembled reamer insert.

One will recognize on the basis of the representation in accordance with FIG. 2 that recess 36 in carrier element 20 is limited by two surfaces, namely a support surface 40 and a wall 42 arranged perpendicular to it. The clamping claw is braced floor side through an area segment 42 on support surface 40. In the region of its end facing away form the surface segment, the clamping claw 34 is incorporated into a pocket 44, in which the indexable insert 30 is accommodated in a form-locking manner. The pocket 44 has a bottom surface 46, on which the indexable insert is supported flat on its one large area 30-1. The opposite large area 30-2 is braced on support surface 40 of carrier element 20.

The pocket 44 is constructed such that the depth T (cf. FIG. 7) is smaller by a predetermined dimension than diode D (cf. FIG. 2) of the indexable insert 30. In addition to this, the bottom area of the clamping claw 34 in connection with surface segment 42 has a free milled area 48, which extends up to the front end (left end in accordance with FIG. 3) of the clamping claw 34. With this configuration it is assured that the clamping claw 34 rests on the carrier element 20 only with its surface segment 42 in the installed state so that when tightening the clamping screw 18, the clamping force can be transmitted over the surface pairing 46/30-1 to the indexable insert 30.

As FIGS. 2 to 9 show, the axis 39 of the clamping screw 38 is situated basically centered between surface segment 42 and support surface region 40-1 through which the indexable insert 30 lies flat on support surface 40.

An opening 37 is provided in the clamping claw 34 for accommodating the clamping screw 38, wherein said opening has the shape of an elongated hole and whose smaller diameter D37 is greater than the diameter of the not depicted shaft of the clamping screw 38. For accommodating a screw head, which, for example, is outfitted with a hexagonal socket recess, a depression 35 is constructed on the upper side of the clamping claw 34. For clamping purposes, the clamping screw engages into a threaded bore hole 47 in the carrier element 20 indicated in dotted lines.

The axis 39 of the clamping screw stands perpendicular on the support surface 40 in the embodiment depicted. This is, however, not absolutely necessary. It would also be conceivable to incline this axis toward the surface segment 42 at an acute angle.

The dimension, by which the surface of the free milled area 48 is behind the surface of the surface segment 42, is designated with reference number MF. This dimension amounts to between 0.1 and 0.5 mm, preferably between 0.1 and 0.3 mm.

Figure 4:
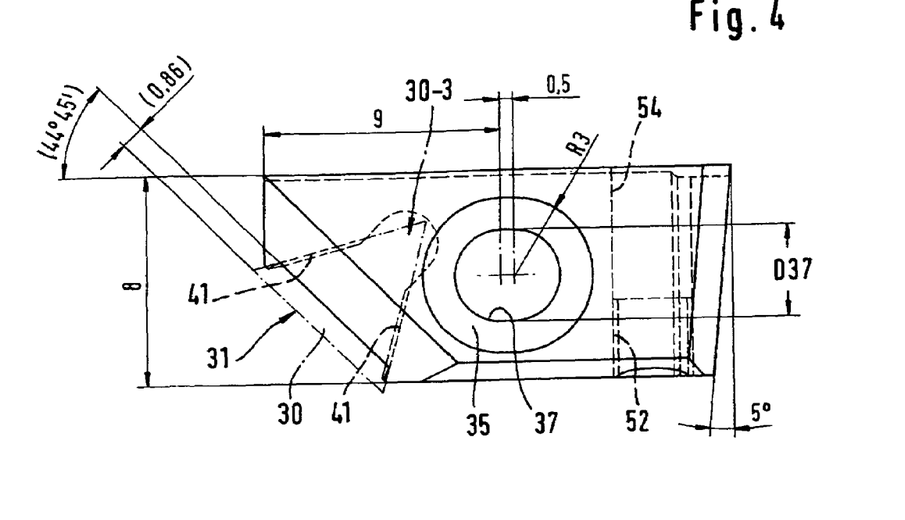
FIG. 4 gives the view in accordance with "IV" in FIG. 3.

With the embodiment depicted, the indexable insert 30 is formed by a triangular plate, the contour of which is indicated in FIG. 4 with a dotted line. The pocket 44 in the clamping claw 34 is correspondingly so constructed that three support surfaces are provided for the indexable insert. Undercut side wall areas 41 (see FIG. 9) connect with the bottom areas 46 parallel to the surface segment 42, wherein the inclination of said wall areas is so adapted to the configuration of the indexable insert that in the inserted state, the [free] surfaces of the indexable insert are braced flat on these side walls. The shape of the pocket is in addition selected so that in the inserted state of the indexable insert 30 the functional cutter blade 31 projects from the clamping claw body 34 so that the cutter blade can enter into operation.

Figure 5:
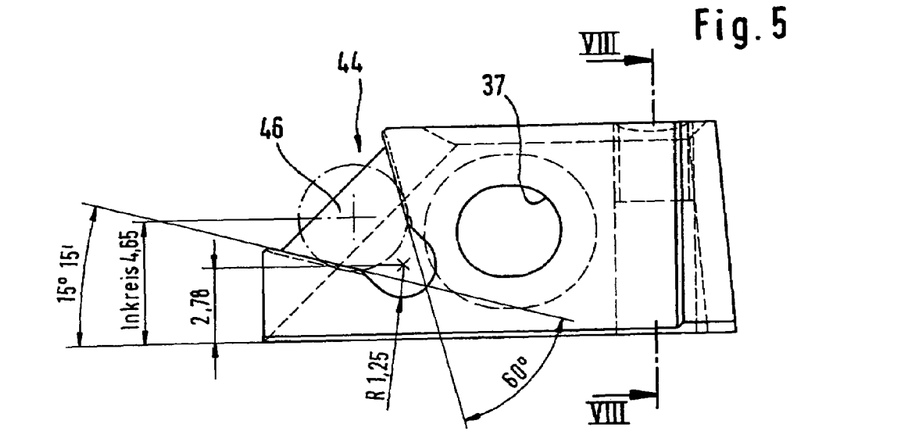
FIG. 5 shows the view in accordance with "V" in FIG. 3.
Figure 6:
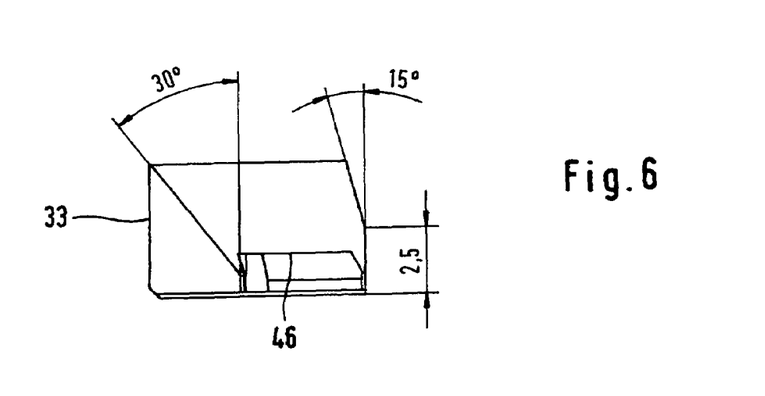
FIG. 6 reveals the view in accordance with "VI" in FIG. 3.
Figure 7:
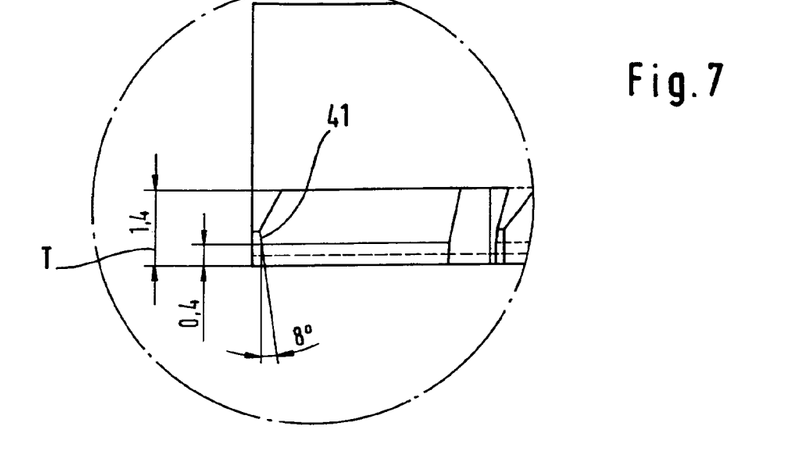
FIG. 7 represents detail "VII" in FIG. 3.
Figure 8:
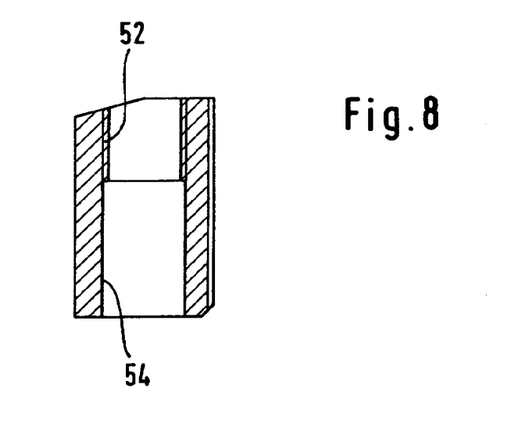
FIG. 8 depicts the sectional view with a section guide along line "VIII—VIII" in FIG. 3.

The pocket is preferably produced with a dipping process into the body of the clamping claw 34 with an undercut miller, which is indicated by the circle in dotted lines in FIG. 5. The base of the free milled area for pocket 44 is milled free using a cylindrical end milling cutter so that a free space remains for the enclosed tip 30-3 of the indexable insert 30 in the inserted state.

If the indexable insert 30 is inserted into the pocket 44 in accordance with FIG. 4, it is already held in the pocket by the undercut configuration of the side walls 41. The clamping claw with inserted indexable insert 30 can now be placed on support surface 40. In this condition, the clamping screw 38 is inserted through the opening 37 and brought into engagement with the thread 47. By tightening the screw, the screw head comes into ever firmer contact with the depression 35, through which the indexable insert is pressed with its surface 30-2 against the support surface 40. In this preassembled state, the fine adjustment of the orientation of the functional cutter blade 31 can thenceforth take place.

For this purpose, a threaded bore hole 52 is constructed at the side of the opening 37, wherein the axis of said bore hole basically is perpendicular on a side wall 33 and therewith on wall segment 22 of the recess 36 in the carrier element 20. The threaded bore hole transfers into a cylindrical bore hole segment 54, in which a cylindrical, ground bolt not depicted in more detail is movably passed. A grub screw 50, which has a hexagonal socket recess on its front side, can be screwed into the threaded bore hole 52. The grub screw is braced, while being screwed in with increasing force, on the cylindrical and ground pin, which is passed in the cylindrical bore hole 54 with fit; said pin pressed out of the cylindrical bore hole 54 and is supported in turn with increasing force on the wall segment 22. Since the grub screw in consequently rotated into the clamping claw 34, the clamping claw with the part facing away from the indexable insert 30 is displaced radially outward so that a fine adjustment of the functional cutter blade 31 takes place with respect to the RA (radial) and/or RO (twisting motion) degree of freedom.

Since a ground bolt is used for this fine adjustment, the adjustment can take place jerk-free, and it can be ensured that the pressure bolt does not dig into the wall segment 22. Of course the dimensions of the opening 37 are selected such that sufficient free space remains about the shaft of the clamping screw so that the fine adjustment can be conducted free of constraint. It has become apparent that the configuration of the invention makes it possible for the fine adjustment and clamping apparatus to position the functional cutter blade 31 exactly within the tolerance range of a few angular minutes.

So that the third degree of freedom, that is, the fine adjustment in the axial direction (AX degree of freedom), can be conducted, the wall facing away from the indexable insert and being basically perpendicular on the support surface 40 or on the surface segment 42 is supported on a conical adjustment element 62 which, for example, is formed by a conical ring, which is braced either along a line or along a surface of a matching surface 64 of the clamping claw 34. The conical adjustment element 62 is driven, for example, by means of a left/right screw, the head of which is can be seen in FIG. 1, so that it is movable upon actuation through a hexagonal socket recess corresponding to double arrow ST in FIG. 2.

Figure 3:
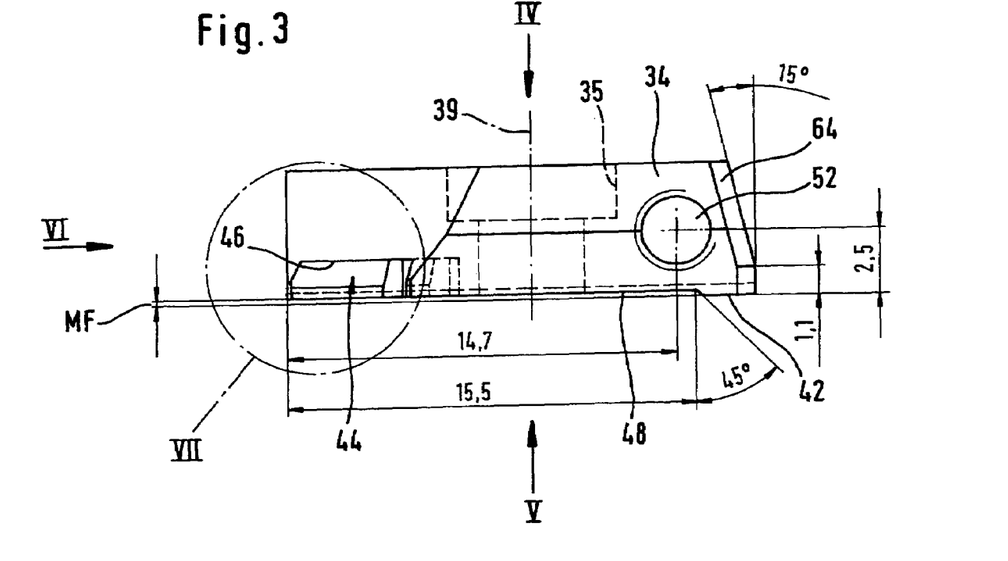
FIG. 3 provides a side view of the clamping claw used in connection with the tool according to FIG. 1, 2 for a cutter blade insert in the shape of a DIN indexable insert.

If the conical adjustment element is moved toward support surface 40, the increasing surface contact between the conical adjustment element 62 and the likewise conical matching surface 64 presses the clamping claw axially, i.e. in accordance with FIG. 3, to the left, owing to which an adjustment as to length of the functional cutter blade 30 is implemented. The angle of the conicity of the conical adjustment element 62 or of the matching surface 64 is indicated with 15° in FIG. 3. It is nonetheless clear that this dimension information is only to be viewed by way of example. The degree of translation for the fine adjustment can be correspondingly amplified through appropriate variation of this angle of conicity. The same applies for dimensioning the threaded segment for the left/right screw not depicted in greater detail.

It becomes clear from the preceding description that the indexable insert 30, owing to the fact that it is form-locking and preferably accommodated in the undercut pocket of the clamping claw, is no longer moved relative to the clamping claw during fine adjustment, so that the functional cutter blade 31 in fact executes the desired motions during activation of the adjustment apparatuses 50, 60. In other words, the cutter blade insert, or the indexable insert equally joins in on the motions of the clamping claw without requiring additional aid. The indexable insert can therefore have a very simple configuration, that means that one can work with conventional DIN indexable insert, which in addition need not be weakened by any openings.

If the adjustment of the functional cutter blade 31 is concluded with the three degrees of freedom AX, RA and RO, the clamping screw 38 is finally tightened, owing to which the position of the functional cutter blade 31 is fixed immovably in relation to the carrier element 20. Since the pocket 44 forms in the clamping claw a comparatively large resting surface (as is apparent in FIG. 5) for the indexable insert 30, the indexable insert itself is not overstressed even with the largest clamping forces, since they can be supported by a likewise large matching surface on the support surface. Clamping the indexable insert takes place directly behind the cutter blade so that an extremely good flux of force from the cutter blade into the tool is assured. The tool in addition can be used very economically. In the event that another form of indexable insert is to be used, merely the clamping claw needs to be exchanged. Because moreover the indexable insert is braced flat in the pocket, the indexable insert is not overstressed during fine adjustment, and even when it is pressed by the clamping screw already with great force against the support surface, since it is held flat and sandwich-like between the clamping surfaces.

Figure 9:
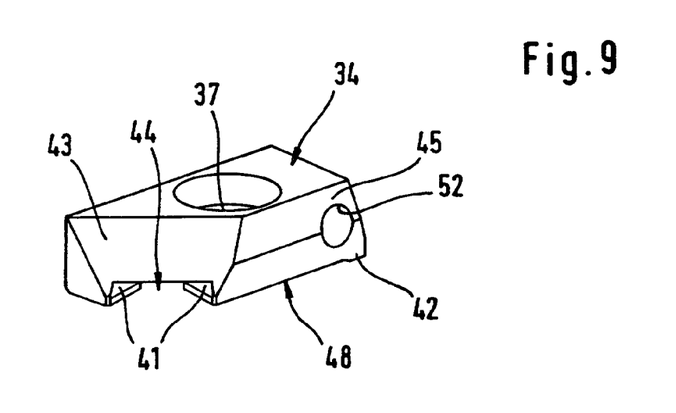
FIG. 9 presents in a somewhat diminished scale a perspective view of the clamping claw with the cutter blade insert removed.

One will recognize from the representation in accordance with FIG. 9 that the shape of the clamping claw 34 can be kept very simple. Basically merely a cuboid-shaped body is needed, which is milled free on one corner to form a pocket 44 for accommodating the indexable insert, which has a further free milled area 58 bottom side and which is provided with an opening 37 for the clamping screw and with a bore hole 52, 54 for the adjusting apparatus 50. Tapered surfaces, whose function consists of improving discharge of stress, are designated with reference numbers 43 and 45.

Of course, deviations from the previously described embodiment are possible without leaving the basic concept of the invention.

Figure 10:
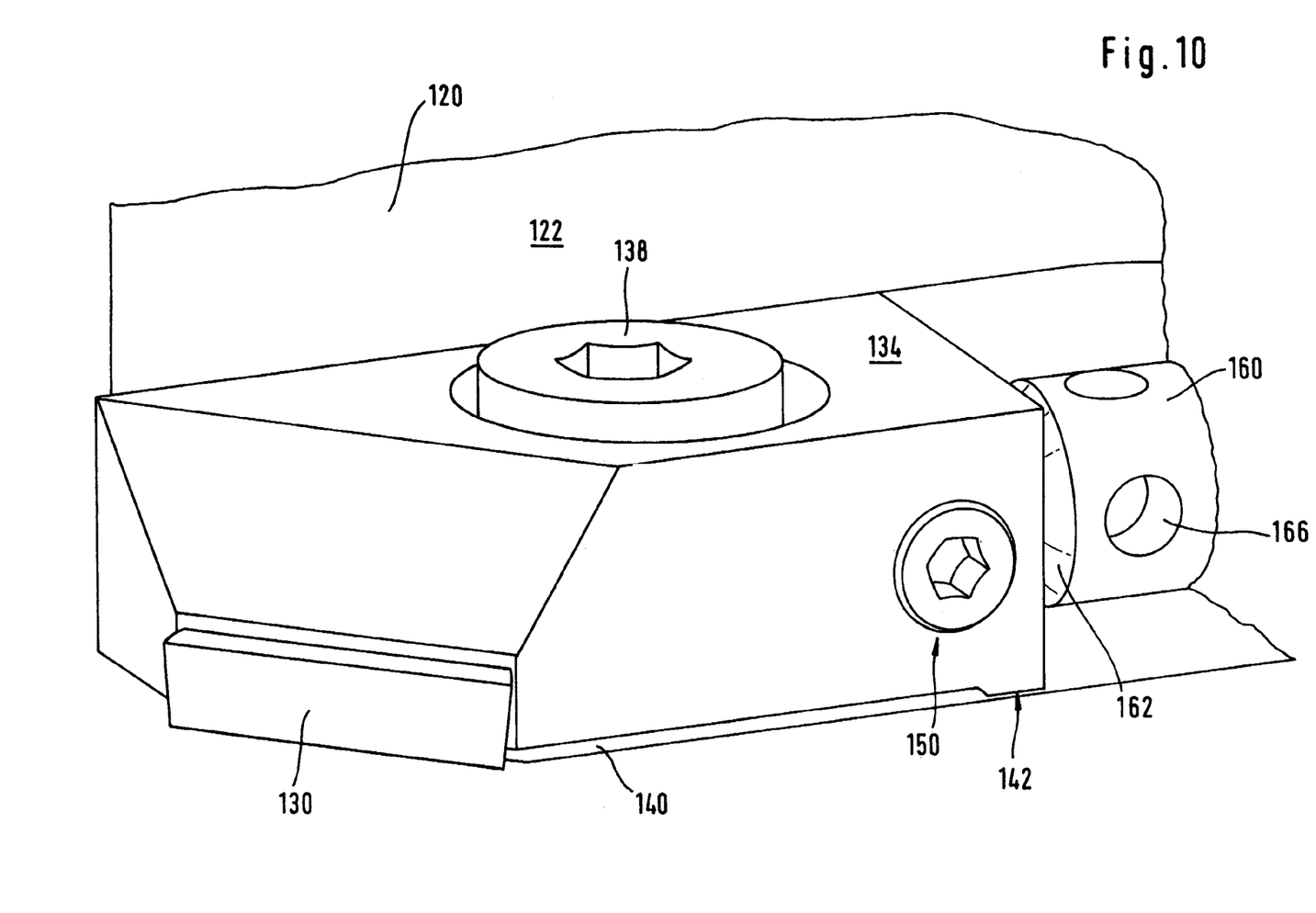
FIG. 10 shows in an enlarged scale a perspective view of a clamping claw with cutter blade insert clamped by it in accordance with a further embodiment of the tool.

A variant is shown by way of example in FIG. 10 where the axial adjustment of the clamping claw 134 is implemented using a modified adjustment apparatus 160, which is braced with a convex support segment 162 on a plane surface of the clamping claw 134. The openings are indicated with 166, through which a suitable tool for length adjustment of the convex segment 162 can be actuated. With regard to the remaining features, the embodiment according to FIG. 10 corresponds to those of FIGS. 1 through 9 so that a thorough description of this embodiment can be dispensed with to avoid repetitions. Components of the embodiment according to FIG. 10, which correspond to the components of the variants according to FIGS. 1 to 9, are designated with similar reference numbers, which are however preceded by a "1."

Instead of the singular adjustment apparatus 50, 150 depicted in the Figures for adjusting the radial distance of the clamping claws 34, 134 from the wall 22, 122 two otherwise identical adjustment apparatuses arranged parallel to each other are used so that a purely radial adjustment of the clamping claws can be implemented.

It is moreover obviously possible to outfit the tool with cutter blade inserts or indexable inserts, which have a basically other profiling, such as, for example, cuboid indexable inserts (e.g., indexable insert 130 in FIG. 10) that comply with German Institute of Standardization (DIN) standards.

In the previously described embodiments, the indexable insert is held in the pocket through friction locking or through the undercut side walls. In order to rule out a motion of the cutter blade insert out of the pocket even more reliably, additional measures can be taken to attach or position the cutter blade insert in the pocket such that a relative movement during fine positioning of the clamping claws does not take place. This could, for example, occur with additional surfaces or ribs, which interact with matching surfaces in the indexable insert.

The adjustment principle was described above using grub screws and ground bolts on the basis of the adjustment apparatus 50 or 150. It is nonetheless equally possible to operate with an adjustment of this type in the area of axial adjustment, that is, the adjustment apparatus 60 or 160.

The invention consequently creates a tool, especially a circulating tool for the machining, especially for the cutting processing of workpieces where a carrier element bears at least one cutter blade insert, especially a plate-like cutter blade insert, such as, for example, a DIN indexable insert, while being exactly positioned. An adjustment device for adjusting the position of the cutter blade relative to the carrier element and a clamping device using a clamping claw are provided, with which the cutter blade insert can be fixed in the adjusted position relative to the carrier element such that the clamping claw presses the cutter blade insert flat against a support surface. In order to be able to use indexable inserts of any desired shape and above all any desired small indexable inserts without providing weakening openings and in order to obtain the greatest possible measure in free space for configuring the tool and shavings removal with a spacing-saving configuration of the adjusting and clamping apparatus, the cutter blade insert is accommodated in a pocket of the clamping claw and the support surface is constructed directly on the carrier element.

The invention claimed is:

1. A tool for machining of workpieces, comprising a carrier element that bears at least one cutter blade insert, whereby an adjusting apparatus is provided for adjusting the position of the cutting insert relative to the carrier element and a clamping device is provided in the form of a clamping claw, with which the cutter blade insert can be fixed in the adjusted position relative to the carrier element in that the clamping claw presses the cutter blade insert flat against a support surface, wherein the cutter blade insert is accommodated in a pocket of the clamping claw and the support surface is constructed on the carrier element, wherein the clamping claw can be clamped against the cutter blade insert by means of a clamping screw, which is oriented in an tilt angle toward the support surface, and wherein the clamping screw penetrates the clamping claw with lateral play.

2. The tool according to claim 1, wherein the pocket in the clamping claw accommodates the cutter blade insert in a form-locking manner such that the cutter blade insert can be braced through at least two surfaces standing at an angle toward each other in the pocket.

3. The tool according to claim 1, wherein the clamping claw generally has the shape of a cuboid and the pocket is constructed in a plane surface of the cuboid as a recess, which is adapted to the dimensions of the cutter blade insert such that the cutter blade insert in its state accommodated in the clamping claw projects with a contact region striking against the support surface by a predetermined dimension from the clamping claw.

4. The tool according to claim 1, wherein the clamping claw is accommodated in a recess of the carrier element whereby the support surface is a component of the recess.

5. The tool according to claim 1, wherein said at least one cutter blade insert is a plate-like cutter blade insert.

6. The tool according to claim 1, wherein the tilt angle is about 90°.

7. The tool according to claim 1, wherein the cutter blade insert is made of a wear and tear resistant material.

8. The tool according to claim 1, wherein the clamping claw is braced through a further seating surface on the carrier element.

9. The tool according to claim 8, wherein the further seating surface can be clamped against a surface of the recess for the clamping claw.

10. The tool according to claim 1, wherein the clamping claw and therewith the cutter blade insert are adjustable parallel to the plane of the support surface.

11. The tool according to claim 10, wherein the clamping claw and therewith the cutter blade insert are movable parallel to the plane of the support surface.

12. The tool according to claim 10, wherein the clamping claw and therewith the cutter blade insert are swivellable parallel to the plane of the support surface.

13. The tool according to claim 1, wherein the cutter blade insert is formed by a cutter blade plate, which is supported on the one hand flat on the support surface of the carrier element and on the other on a bottom surface of the pocket in the clamping claw.

14. The tool according to claim 13, wherein the cutter blade insert is an indexable insert.

15. The tool according to claim 13, wherein the recess in the clamping claw has undercut side walls, on which free surfaces of the cutter blade insert are supported.

16. The tool according to claim 3, wherein the recess is constructed in the clamping claw in a corner region.

17. The tool according to claim 3, wherein the pocket is constructed in a corner region on the side facing the support surface in the form of a milled-in area with a bottom surface parallel to the support surface.

18. The tool according to claim 3, wherein the clamping claw is moveable and/or swivellable using a screw bolt arrangement in a plane parallel to the support surface.

19. A tool for machining of workpieces, comprising a carrier element that bears at least one cutter blade insert, whereby an adjusting apparatus is provided for adjusting the position of the cutting insert relative to the carrier element and a clamping device is provided in the form of a clamping claw, with which the cutter blade insert can be fixed in the adjusted position relative to the carrier element in that the clamping claw presses the cutter blade insert flat against a support surface, wherein the cutter blade insert is accommodated in a pocket of the clamping claw and the support surface is constructed on the carrier element, wherein the clamping claw is moveable and/or swivellable using a screw bolt arrangement in a plane parallel to the support surface, wherein the clamping claw generally has the shape of a cuboid and the pocket is constructed in a plane surface of the cuboid as a recess, which is adapted to the dimensions of the cutter blade insert such that the cutter blade insert in its state accommodated in the clamping claw projects with a contact region striking against the support surface by a predetermined dimension from the clamping claw, wherein the screw bolt arrangement penetrates the clamping claw basically centered.

20. The tool according to claim 19, characterized in that the screw bolt arrangement has a ground bolt, with which the clamping claw is braced on a matching surface of the recess in the carrier element.

21. The tool according to claim 8, wherein the further seating surface of the clamping claw is constructed in the region of the other end of the clamping claw in relation to the clamping apparatus.

22. A tool for machining of workpieces, comprising a carrier element that bears at least one cutter blade insert, whereby an adjusting apparatus is provided for adjusting the position of the cutting insert relative to the carrier element and a clamping device is provided in the form of a clamping claw, with which the cutter blade insert can be fixed in the adjusted position relative to the carrier element in that the clamping claw presses the cutter blade insert flat against a support surface, wherein the cutter blade insert is accommodated in a pocket of the clamping claw and the support surface is constructed on the carrier element, wherein the clamping claw is braced through a further seating surface on the carrier element, wherein the further seating surface of the clamping claw is constructed in the region of the other end of the clamping claw in relation to the clamping apparatus, wherein the further seating surface is formed by a material bar, which remains on the underside of the clamping claw through a free milled area.

23. A tool for machining of workpieces, comprising a carrier element that bears at least one cutter blade insert, whereby an adjusting apparatus is provided for adjusting the position of the cutting insert relative to the carrier element and a clamping device is provided in the form of a clamping claw, with which the cutter blade insert can be fixed in the adjusted position relative to the carrier element in that the clamping claw presses the cutter blade insert flat against a support surface, wherein the cutter blade insert is accommodated in a pocket of the clamping claw and the support surface is constructed on the carrier element, wherein the clamping claw and therewith the cutter blade insert are adjustable parallel to the plane of the support surface, wherein the clamping claw is braced on the side facing away from the cutter blade insert on an adjustment element.

24. The tool according to claim 23, wherein the adjustment element is formed by a wedge element, which is braced flat on a correspondingly configured outer surface of the clamping claw and is moveable using an adjustment apparatus.

25. The tool according to claim 7, wherein the cutter blade insert is made of a cermet.

26. The tool according to claim 1, wherein the cutter blade insert has the shape of a polygonal plate.

27. The tool according to claim 26, wherein the cutter blade insert has the shape of a triangular plate.

28. The tool according to claim 26, wherein the cutter blade insert has the shape of a cuboid.

29. The tool according to claim 1, wherein the construction as a rotary driven bore hole refinishing tool where the at least one cutter blade insert serves the fine machining of a surface, which has a relative position toward the axis of rotation of the tool with tight tolerance settings.

30. The tool according to claim 29, wherein the recess of the carrier element is formed by an axial milling in with two surfaces standing at an angle toward each other, one of which forms the support surface for the cutter blade insert.

31. The tool according to claim 7, wherein the cutter blade insert is made of a ceramic.

32. The tool according to claim 7, wherein the cutter blade insert is made of a hard metal.

* * * * *